United States Patent
Kane et al.

(10) Patent No.: US 6,209,684 B1
(45) Date of Patent: Apr. 3, 2001

(54) TIRE BEAD SOAPER

(75) Inventors: John P. Kane, Sterling Heights; Karl D. Sachs, Birmingham, both of MI (US)

(73) Assignee: Aim Automotive Integrated Manufacturing, Inc., Sterling Heights, MI (US)

( * ) Notice: Subject to any disclaimer, the term of this patent is extended or adjusted under 35 U.S.C. 154(b) by 0 days.

(21) Appl. No.: 09/326,287

(22) Filed: Jun. 7, 1999

(51) Int. Cl.[7] .................................. B05C 1/02; B05C 7/06
(52) U.S. Cl. ................................ 184/101; 118/214
(58) Field of Search .................... 184/101, 102; 118/317, 318, 320, 214, 254

(56) References Cited

U.S. PATENT DOCUMENTS

| 3,658,152 | 4/1972 | Mueller .............................. 184/109 |
| 4,085,894 | * 4/1978 | Kubo et al. ...................... 118/317 X |
| 4,181,170 | 1/1980 | Price et al. ........................... 157/1.1 |
| 4,430,958 | * 2/1984 | Boggs .............................. 118/318 X |
| 4,563,975 | 1/1986 | Kozlowski et al. ................. 118/320 |
| 4,638,756 | 1/1987 | Collmann ............................ 118/215 |
| 4,669,417 | * 6/1987 | Pederson et al. ................ 118/318 X |
| 4,723,563 | 2/1988 | Kane ................................ 118/320 X |
| 4,834,159 | 5/1989 | Burger .................................. 157/1 |
| 4,958,587 | * 9/1990 | Fogal, Sr. et al. ............... 118/318 X |
| 5,562,773 | 10/1996 | Church ............................ 118/320 X |
| 5,642,790 | 7/1997 | Kane et al. ......................... 184/102 |
| 5,728,220 | * 3/1998 | Curcuri et al. ...................... 118/324 |
| 5,876,501 | * 3/1999 | Doan .............................. 184/102 X |
| 6,119,814 | * 9/2000 | Kane et al. ......................... 184/101 |

* cited by examiner

*Primary Examiner*—Charles A Marmor
*Assistant Examiner*—Ankur Parekh
(74) *Attorney, Agent, or Firm*—Young & Basile, P.C.

(57) ABSTRACT

An apparatus and method is disclosed for lubricating the spaced apart beads of a pneumatic tire prior to mounting of the tire on a wheel. A conveyor is provided for moving the tires having different outside diameters, axial widths, and central opening diameters fed in random succession along a fixed path through a lubrication station. An interceptor is positioned in proximity to the station and is moveable between a first position where tires delivered to the station by the conveyor move freely through the station, and a second position where tires delivered to the station by the conveyor engage the interceptor to stop the tires on the conveyor at the station. The interceptor stops successive tires of varying sizes to perform a lubrication operation on the tires of varying sizes when intermixed on the conveyor in random order. The interceptor is selectively moveable between the first and second position. At least one longitudinally extending, lubricating member is provided having a first axis. The lubricating member is rotatable about an axis of rotation offset from the first axis, such that a distance between the axis of rotation and the first axis is at least as great as a radius as the central opening diameter of the largest tire to be lubricated.

20 Claims, 5 Drawing Sheets

TIRE BEAD SOAPER

FIELD OF THE INVENTION

The present invention relates to an apparatus and method for lubricating the spaced apart beads of a tire to be mounted and inflated on a wheel, and more particularly to an apparatus for accommodating tires having different outside diameters, axial widths, and central opening diameters fed in random succession along a fixed path through a lubrication station for lubricating the spaced apart beads of the tire to be mounted and inflated on a wheel.

BACKGROUND OF THE INVENTION

Automated equipment has previously been proposed for mounting tires on vehicle wheels and for inflating the tires after mounting. These devices must be capable of handling a wide variety of wheel sizes and types, and corresponding tire sizes and types. Typically, the wheel is moved through a plurality of stations to accomplish different steps in the tire mounting process. One step in mounting a tire on a wheel involves the lubrication or soaping of the tire and/or wheel prior to mounting of the tire onto the wheel. Soaping lubricates the tire and/or wheel so that the tire will not be damaged when it is mounted, and so that the wheel will properly engage the bead seats when it is inflated.

Although a variety of devices have been proposed for automatically soaping or lubricating wheels and/or tires, the previously proposed devices have been relatively complicated in operation and also have not been adaptable to handle a wide variety of wheel sizes and types, and corresponding tire sizes and types. In many devices, it is necessary to reorient the tire prior to soaping or lubricating the tire beads. After lubrication, the tire must be returned to the conveying orientation for further processing. Typically, additional equipment is required to move the tire from the conveying orientation to the lubricating orientation, and then to reorient the tire back to the conveying orientation.

SUMMARY OF THE INVENTION

It is desirable in the present invention to provide an apparatus for applying a lubricant to first and second spaced apart beads defining an opening of a pneumatic tire prior to mounting of the tire on the wheel. It is further desirable in the present invention to provide an apparatus capable of accommodating tires having different outside diameters, axial widths, and central opening diameters fed in random succession along a fixed path through a lubrication station. Further, it is desirable in the present invention to provide an apparatus capable of lubricating a tire while in the conveying orientation without requiring additional equipment to change the orientation of the tire between the conveying orientation and the lubricating orientation.

According to the present invention, the apparatus includes a supporting surface at a lubrication station, where at least one lubricating head is located. The lubricating head preferably includes a crank arm having an axis of rotation. The lubricating head is moveable axially with respect to the tire supporting surface between a first axial position spaced from the tire supporting surface and a second axial position disposed adjacent to the tire supporting surface. The crank arm of the lubricating head is rotatable about the axis of rotation when in the second axial position. At least one lubricating member is supported by the crank arm of the lubricating head and is spaced radially from the axis of rotation of the crank arm for applying lubricant to the first and second spaced apart beads. The lubricating member is axially insertable through the opening defined by the first and second spaced apart beads of the tire to be lubricated when the lubricating head is in the second position, and is operable in response to rotation of the crank arm through at least 360° to apply lubricant along an entire periphery of the first and second beads. Preferably, the radial distance between the axis of rotation of the crank arm and the lubricating member is at least as great as a radius of the opening of the tire to be lubricated, and more preferably the radial distance is greater than a radius of the opening of the tire to be lubricated.

An apparatus according to the present invention can also include a tire conveyor for moving tires having different outside diameters, axial widths and central opening diameters fed in random succession along a fixed path through a lubrication station. An interceptor is positioned in proximity to the lubrication station and is moveable between a first position where tires delivered to the station by the conveyor move freely through the station, and a second position where tires delivered to the station by the conveyor are engaged by the interceptor to stop the tires on the conveyor at the station. The interceptor stops successive tires of varying sizes to perform a lubrication operation on the tires when intermixed on the conveyor in random order. The interceptor is selectively moveable between the first and second positions. At least one longitudinally extending, lubricating member is positioned at the lubrication station and has a first axis offset from an axis of rotation, such that two times a distance between the axis of rotation and the first axis is at least as great as a central opening diameter of the tire to be lubricated.

The present invention can also include a lubricating liquid supply for supplying lubricating liquid to the lubricating member. Control means can also be provided for controlling operation of the interceptor and/or lubricating member for inserting the lubricating member within the central opening of the tire supported on the tire supporting surface and rotating the lubricating member about the substantially vertical axis whereby lubricating liquid is applied to the beads of the tire by the lubricating member as the lubricating member moves with respect to the tire disposed on the tire supporting surface at the lubricating station.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
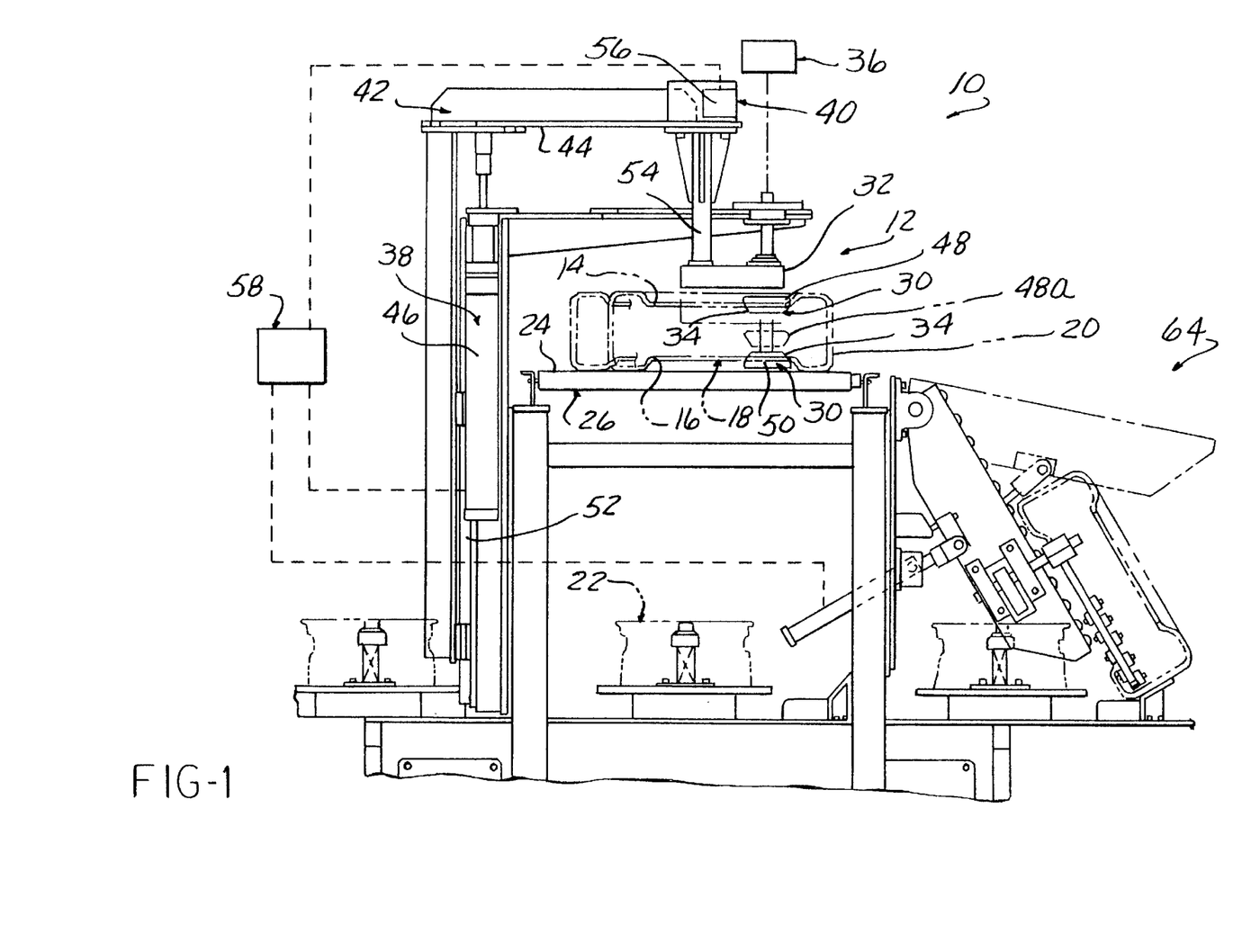
FIG. 1 is a side elevational view of a lubrication station according to the present invention.
Figure 2:
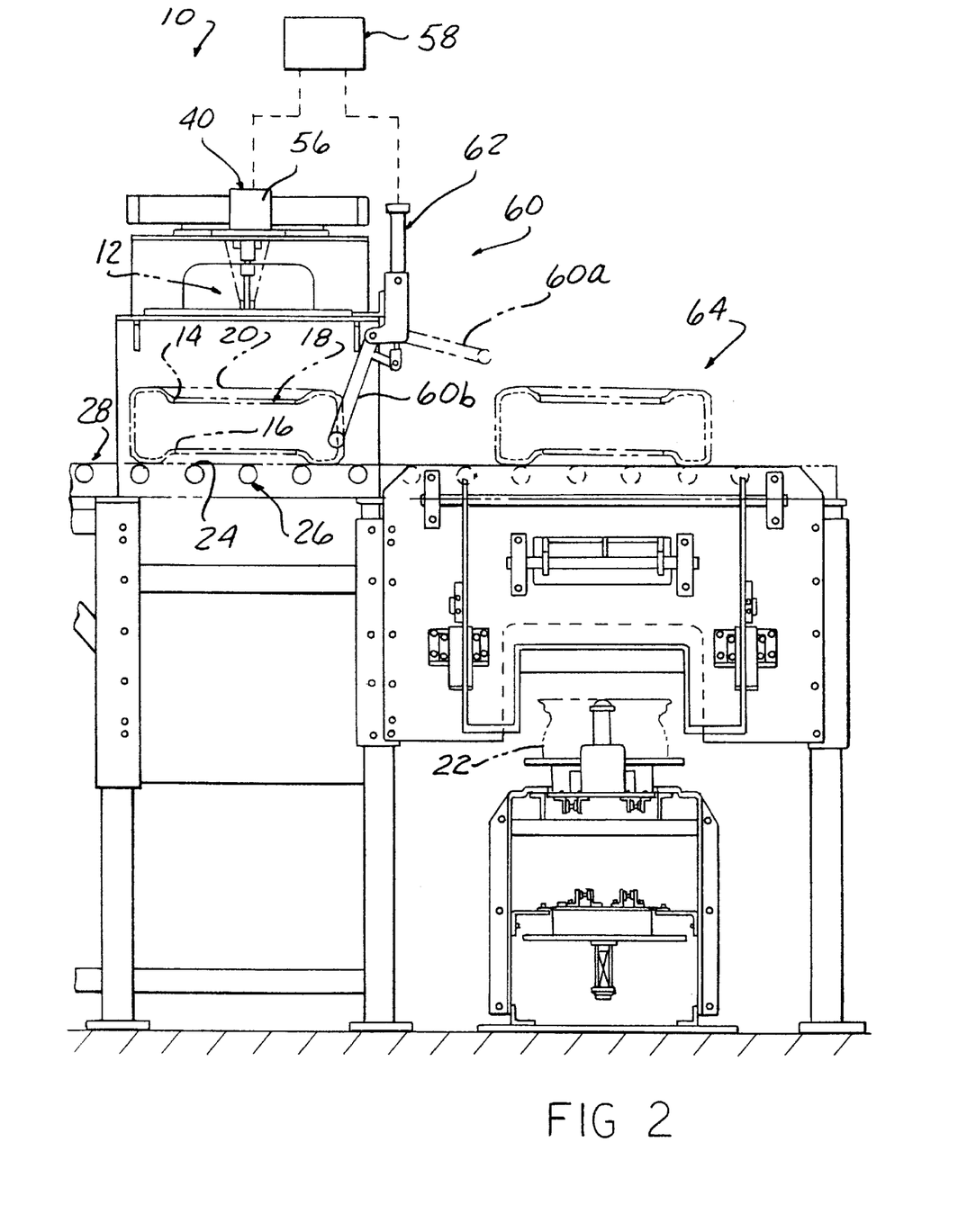
FIG. 2 is an end elevational view of the lubrication station illustrated in FIG. 1.

A lubrication station 10 according to the present invention as illustrated in FIGS. 1 and 2. An apparatus 12 is provided at the lubrication station 10 for applying a lubricant to first and second spaced apart beads 14, 16 defining an opening 18 of an unmounted pneumatic tire 20 prior to mounting of the tire 20 on a wheel 22. A tire supporting surface 24 is located at the lubrication station 10. The tire supporting surface 24 can include a gravity fed or powered conveyor, or the like. The tire supporting surface 24 preferably defines tire supporting means 26 for supporting an unmounted tire 20 in a substantially horizontal manner or orientation. The tire supporting surface 24 can also define conveyor means 28 for moving unmounted tires 20 having different outside diameters, axial widths, and central opening diameters fed in random succession along a fixed path through the lubrication station 10.

At least one lubricating head 30 is located at the lubrication station 10. The lubricating head 30 preferably includes a crank arm 32 having an axis of rotation. Preferably, the lubricating head 30 includes at least one lubricating, liquid-applying member 34 mounted for movement to a position adjacent the tire supporting means 26. The lubricating member 34 preferably extends longitudinally along a first axis that is offset from the axis of rotation of the crank arm 32. Preferably, at least one lubricating member 34 is supported by the crank arm 32 of the lubricating head 30 in a position spaced radially from the axis of rotation of the crank arm 32, which also serves as an axis of revolution for the lubricating member 34, for applying lubricant to the first and second spaced apart beads 14, 16 of the unmounted pneumatic tire 20. Lubricating liquid supply means 36 is provided for supplying lubricating liquid to the member 34.

Means 38 for moving the lubricating head 30 axially with respect to the tire supporting surface 24 is provided. The lubricating head 30 is moveable between a first axial position spaced from the tire supporting surface 24 and a second axial position (illustrated in FIGS. 1 and 2) disposed adjacent to the tire supporting surface 24. Means 40 is provided for rotating the crank arm 32 of the lubricating head 30 about the axis of rotation when in the second axial position. The moving means 38 and rotating means 40 allow the lubricating member 34 to be axially insertable through the opening 18 defined by the first and second spaced apart beads 14, 16 of the tire 20 to be lubricated when the moving means 38 is in the second position. The lubricating member 34 is operable in response to rotation of the crank arm 32 through at least 360° to apply lubricant along an entire periphery of the first and second beads 14, 16 regardless of the size of the opening 18 provided that the radius of the crank arm is at least as great as the radius of the opening 18 and preferably greater than the radius of the opening 18. If the radius of the crank arm 32 is greater than the radius of the opening 18 of the tire 20, the tire 20 moves or slides along the tire supporting surface 24 as the crank arm rotates through a larger diameter arc than the periphery of the opening 18, while the lubricating member 34 engages the entire periphery of the first and second beads 14, 16. The lubricating member 34 is connected to the rotating means 40, or other drive means, such as an electric motor, fluid operated actuator, or the like. Support means 42 is connected to the lubricating member 34 to allow movement between the first axial position and the second axial position, while allowing rotational movement of the lubricating member 34 about the axis of rotation. The support means 42 can include a moveable frame 44 supporting the lubricating head 30 for movement between the first and second positions. The moving means 38 can operably engage the support means 42. The moving means 38 can include a fluid operated actuator 46, or reversible electric motor, operably connected to the moveable frame 44 for driving the moveable frame 44 between the first and second axial positions. As the moveable frame 44 moves between the first and second axial positions, the lubricating member is axially insertable through the opening 18 defined by the first and second spaced apart beads 14, 16 of the tire 20 when the moving means 38 is in the second position. When in the second position, the crank arm 32 is rotatable about an axis of rotation through at least 360° to apply lubricant along an entire periphery of the first and second beads 14, 16.

Preferably, the radial distance between the axis of rotation of the crank arm 32 and the lubricating member 34 is at least as great as a radius of the opening 18 of the tire 20 to be lubricated. Most preferably, the radial distance between the axis of rotation of the crank arm 32 and the lubricating member 34 is greater than a radius of the opening 18 of the tire 20 to be lubricated. In the preferred configuration, the at least one lubricating member 34 includes a first lubricating roller 48 and a second lubricating roller 50. The first and second lubricating rollers 48, 50 are spaced longitudinally from one another along a common axis. Preferably, the first and second rollers 48, 50 are adjustable spaced longitudinally from one another to accommodate tires of varying axial width (as shown in phantom at 48a in FIG. 1).

The moving means 38 can include the fluid operated actuator 46 reciprocal between an extended position and a retracted position. The fluid operated actuator is connectable to the moveable frame 44 supporting the lubricating head 30 for movement between the first and second positions. A stationary guide member 52 guides the moveable frame 44 along a fixed path of travel between the first and second positions as the actuator 46 reciprocates between the extended and retracted positions.

The rotating means 40 can include a drive shaft 54 supporting the crank arm 32 for rotation about the axis of rotation. A motor 56 can be operably connected to the drive shaft 54 for rotating the shaft 54 through at least 360° thereby applying lubricant to the spaced apart beads 14, 16 of the tire 20 to be lubricated.

Control means 58 is provided for controlling the operation of the support means 42 for inserting the lubricating member 34 within the central opening 18 of the tire 20 supported on the tire supporting surface 24 and for rotating the lubricating member 34 about the substantially vertical axis whereby lubricating liquid is applied to the first and second spaced apart beads 14, 16 of the tire 20 to be lubricated by the lubricating member 34 as the lubricating member 34 moves with respect to the tire 20 to be lubricated. As best seen in FIG. 2, intercept means 60 is positioned in proximity to the lubrication station 10 and is moveable between a first position 60a where tires 20 delivered to the station 10 by the conveyor means 28 moves freely through the station 10, and a second position 60b where tires 20 delivered to the station 10 by the conveyor means 28 engage the intercept means 60 to stop the tires 20 on the conveyor means 28 at the station 10. The intercept means 60 stops successive tires 20 of varying sizes to perform a lubrication operation on the tires 20 of varying sizes when intermixed on the conveyor means 28 in random order. Means 62 is provided for moving the intercept means 60 selectively between the first and second positions.

Figure 3:
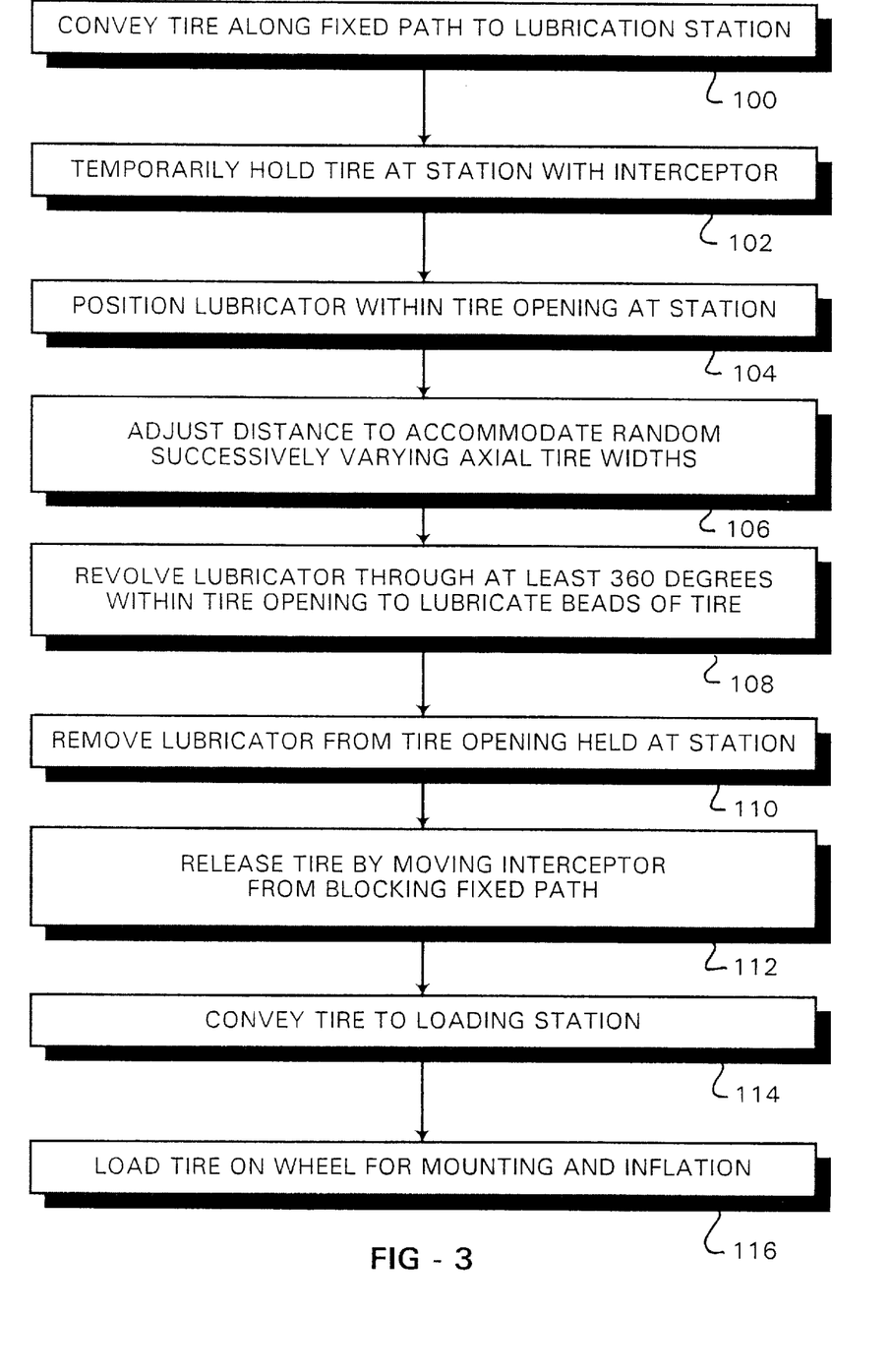
FIG. 3 is a simplified flow diagram illustrating control means for operating the lubrication station according to the present invention.

In operation, the control means 58 operates preferably in accordance with the simplified flow diagram illustrated in FIG. 3. A tire 20 is conveyed along a fixed path to lubrication station 10 as indicated in step 100 of the method illustrated in FIG. 3. The tire 20 is temporarily held at the lubrication station 10 with an interceptor, such as interceptor means 60 as illustrated in step 102. A lubricator, such as lubricating member 34 is positioned within an opening 18 of a tire 20 to be lubricated located at the lubrication station 10 as indicated in step 104. Step 106 is optional in that, if first and second lubricating rollers are provided, the distance between the rollers can be adjusted to accommodated random successively varying axial tire widths fed into the lubrication station 10. The lubricator is revolved in step 108 through at least 360° within the opening 18 of the tire 20 in order to lubricate the spaced apart beads 14, 16 of the tire 20. In step 110, the lubricator is removed from the opening 18 of the tire 20 held at the lubrication station 10. In step 112, the tire 20 is released from the station 10 by moving the interceptor from the first position blocking the fixed path of travel of the tire along the conveyor means 28. The tire 20 is then conveyed to a loading station 64 in step 114. In step 116, the tire 20 is loaded on a wheel 22 for subsequent mounting and inflation.

Figure 4:
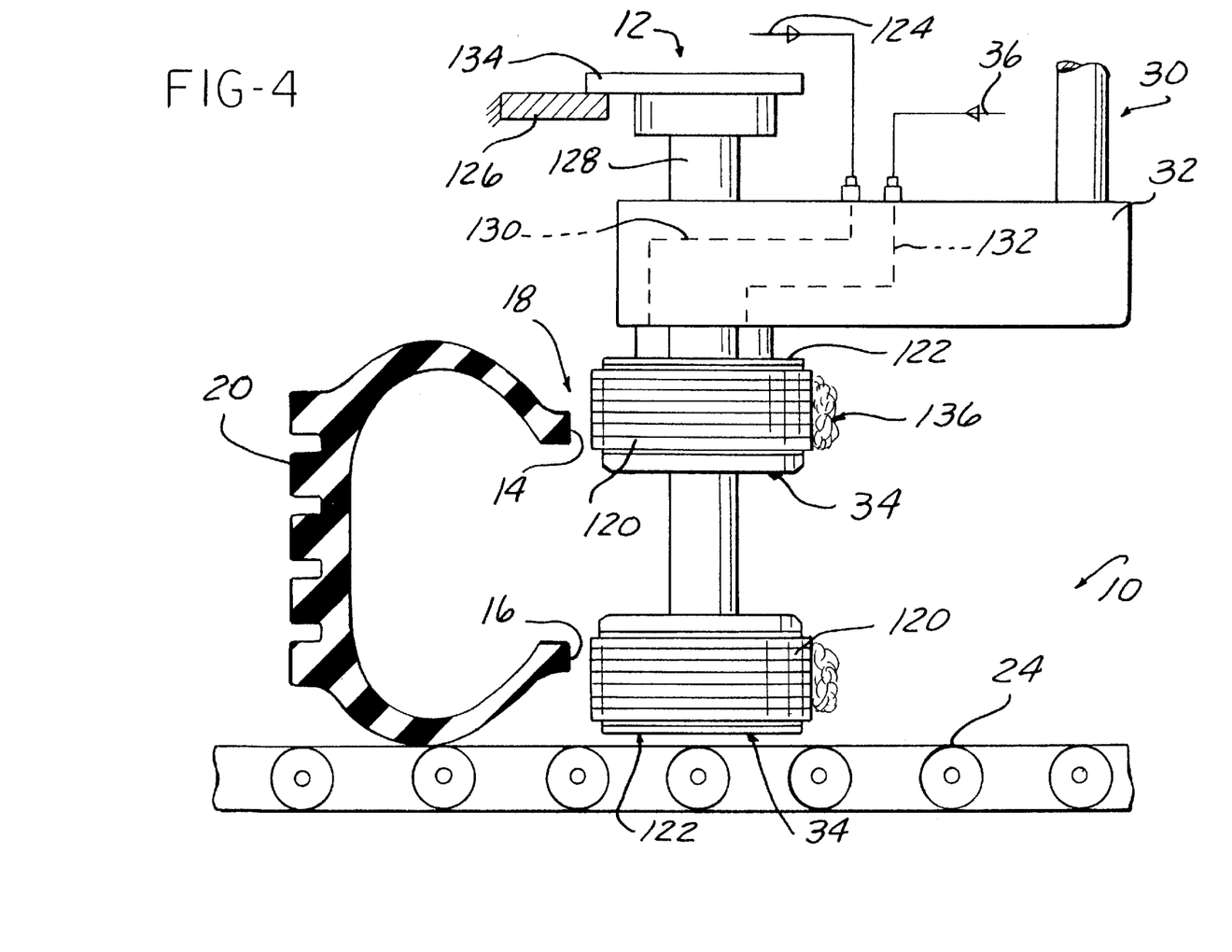
FIG. 4 is a detailed side elevational view of the lubrication station according to the present invention.
Figure 5:
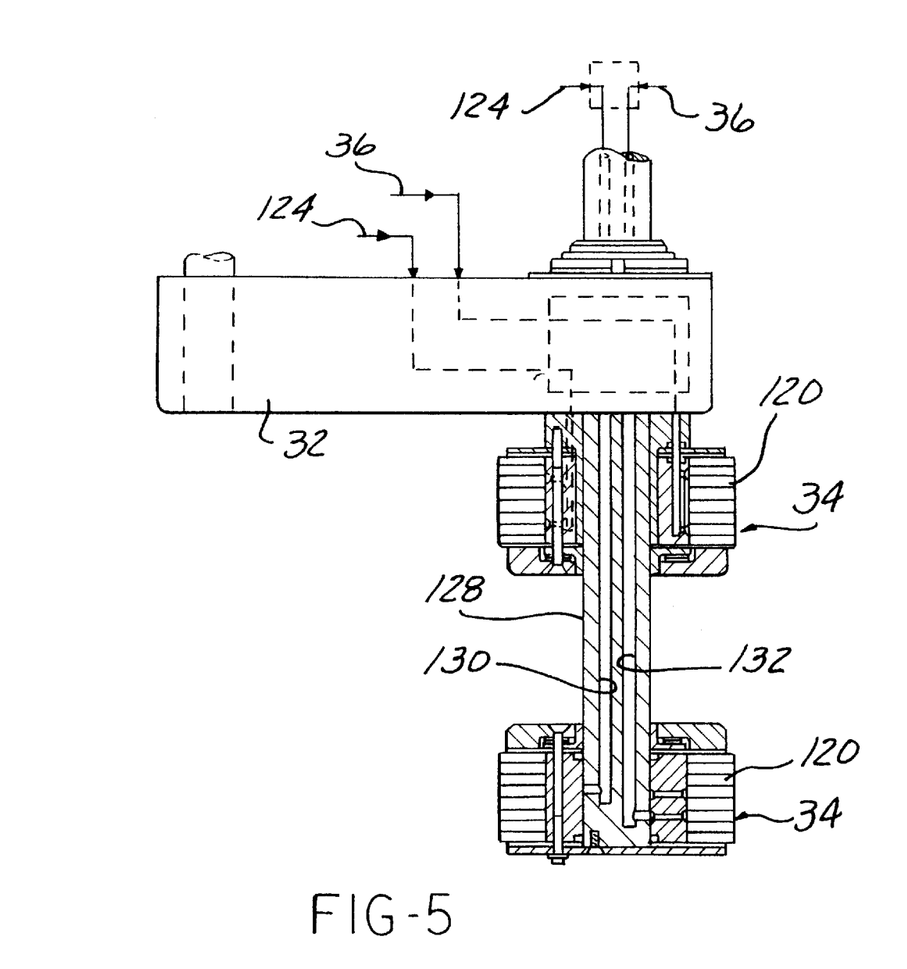
FIG. 5 is a detailed side elevational view of the tire bead soaper according to the present invention.
Figure 6:
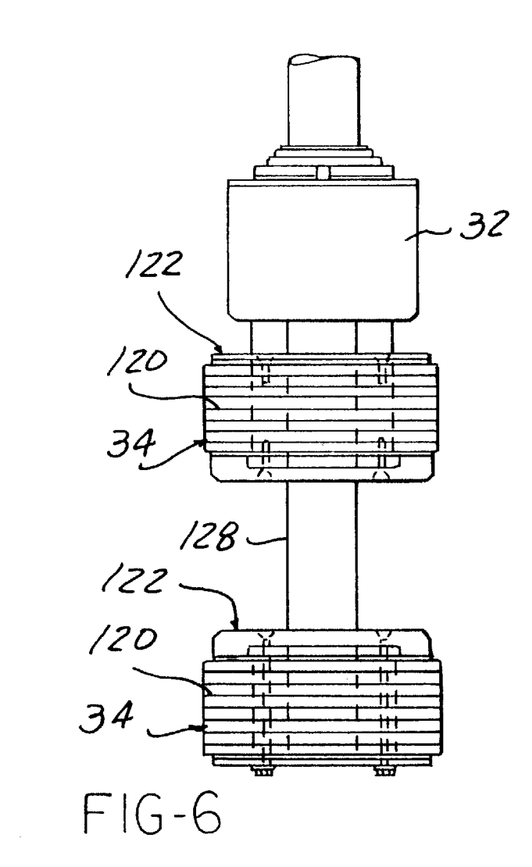
FIG. 6 is an end elevational view of the tire bead soaper illustrated in FIG. 5.

Referring now to FIGS. 4–6, the preferred embodiment is illustrated using a porous applicator, such as felt, foam rubber-open type cell, or sponge-type material. The porous applicator material 120 is mounted in a holding device or mounting bracket 122 serving as a manifold to introduce fluid lubricant and compressed air. The use of fluid alone results in too much fluid being wasted because of low viscosity causing applicator runoff. By applying compressed air after injecting a shot of lubricating fluid, foam 136 is produced. Foam 136 is a more forgiving fluid lubricating media and is able to conform to uneven surfaces for easier transfer from the porous applicator material 120 to the wheel bead area 14, 16. Fluid alone has a tendency to only transfer when an exact match of the two surfaces is achieved. The mixing action to create foam 136 occurs internal to the porous applicator material media 120.

The operation of the apparatus 12 at the lubrication station 10 is as previously described for FIGS. 1–3. The lubricating head 30 is movable between a lubricating position disposed internally with respect to the opening 18 and the unmounted pneumatic tire 20 to be lubricated. Preferably, first and second lubricating, liquid-applying, members 34 are adjustable and axially spaced from one another for operable engagement with the first and second spaced apart beads 14, 16 of the tire 20. The lubricating head 30 includes a crank arm 32 having an axis of rotation. The liquid-applying members 34 are mounted for movement into operable engagement with the spaced apart first and second beads 14, 16 defining the opening 18 and the tire 20. The lubricating member 34 extends longitudinally along a first axis that is offset from the axis of rotation of the crank arm. A lubricating liquid supply means 36 is provided for supplying lubricating liquid to the member 34. In addition, a compressed air supply means 124 is preferably provided for supplying compressed air to the member 34 and to impart a foaming action to the lubricating liquid through the porous applicator material 120 as previously described.

Means 38 (FIG. 1) moves the lubricating head 30 axially with respect to the tire supporting surface 24. The lubricating head 30 is moveable between a rest position spaced axially from the tire supporting surface 24, and a operational position disposed adjacent to the tire supporting surface 24 within the opening 18 of the unmounted pneumatic tire 20. Means 40 (FIG. 1) rotates the crank arm 32 of the lubricating head 30 about the axis of rotation when the lubricating head 30 is in the operable position. The moving means 38 (FIG. 1) and rotating means 40 (FIG. 1) allow the lubricating member 34 to be axially insertable through the opening 18 defined by the first and second spaced apart beads 14, 16 of the tire 20 to be lubricated when the moving means 38 is in the operable position.

The lubricating member 34 is operable in response to rotation of the crank arm 32 through at least 360° of rotation to apply lubricant along an entire periphery of the first and second beads 14, 16 regardless of the size of the opening 18 provided that the radius of the crank arm is at least as great as the radius of the opening 18 and preferably greater than the radius of the opening 18 of the tire 20. As previously described, if the radius of the crank arm 32 is greater than the radius of the opening 18 of the tire 20 the tire 20 moves or slides along the tire supporting surface 24 as the crank arm rotates through a larger diameter arc than the periphery of the opening 18, while the lubricating member 34 engages the entire periphery of the first and second beads 14, 16. The other structure and function of the apparatus 12 for moving the lubricating member 34 axially and rotationally is as previously described.

In the preferred embodiment depicted in FIGS. 4–6, an optional stop member 126 is illustrated extending from an anchored location. The stop 126 is preferably formed as an annular radially extending ring that can be operably engaged in order to position the liquid-applying member that is inserted the furthest into the opening 18 of the tire 20 in order to be aligned with the bead 16. The other liquid-applying member 34 is adjustable axially along the shaft 128 to align and operably engage with the other bead 14. Of course, it should be recognized that the separable, adjustable, liquid-applying members 34 can be replaced with a single liquid-applying member that extends along the longitudinal length of the shaft 28 a sufficient distance in order to operably engage and lubricate the first and second spaced apart beads 14 and 16 of various sizes so that unmounted tires 20 having different outside diameters, axial widths, and central opening diameters can be fed in random succession along the fixed path through the lubrication station 10.

The shaft 128 has first and second passages 130, 132 associated with the shaft 128 to deliver compressed air and lubricating fluid to the porous applicator material 120. The stop 126 is operably engaged by a corresponding stop-engaging member 134 connected to the shaft 128. The stop-engaging member provides a fixed position for the distal end of the shaft 128 to support the porous applicator material 120 in alignment with the spaced apart beads 14, 16. Preferably, the shaft 128 and attached porous applicator material 120 and stop-engaging member 134 are rotatable about a central longitudinal axis of the shaft 128. In the preferred configuration, the stop-engaging member 134 is formed as a radially outwardly extending flange engageable with the stop ring 126 as the crank arm 32 rotates about its longitudinal axis and the shaft 128 rotates in response to engagement of the periphery of the porous applicator material 120 with the spaced apart beads 14, 16. The preferred configuration provides engagement of the stop-engaging member 134, such as a cam follower, with the stop ring 126, such as a cam surface, around the entire periphery as the crank arm 32 rotates through 360° of travel. Due to the smaller external periphery of the porous applicator material 120, the shaft 128 rotates generally at a faster rate than the rotation rate of the crank arm 32, in response to the porous applicator material 120 operably engaging and applying lubricant to the first and second spaced apart beads 14, 16.

While the combination of the stop-engaging member 134 and stop ring 126 accurately position the porous applicator material 120, when the preferred configuration of first and second porous applicator members are provided, the intermediate porous applicator is preferably adjustable along the axial length of the shaft 128 to adapt sufficiently to properly engage the other spaced apart bead of the tire 20 in order to accommodate various axial widths of tires being fed in random succession along the fixed path through the lubrication station 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for applying a lubricant to first and second spaced apart beads defining an opening of an unmounted pneumatic tire prior to mounting of the tire on a wheel comprising:
   a tire supporting surface at a lubrication station;
   at least one lubricating head located at the lubrication station, the lubricating head having a crank arm with an axis of rotation;
   means for moving the lubricating head axially with respect to the tire supporting surface between a first axial position spaced from the tire supporting surface and a second axial position disposed adjacent to the tire supporting surface;
   means for rotating the crank arm of the lubricating head about the axis of rotation when in the second axial position; and
   at least one lubricating member supported by the crank arm of the lubricating head spaced radially from the axis of rotation of the crank arm for applying lubricant to the first and second spaced apart beads, such that the lubricating member is axially insertable through the opening defined by the first and second spaced apart beads of the tire to be lubricated when the moving means is in the second position, and operable in response to rotation of the crank arm through at least 360° to apply lubricant along an entire periphery of the first and second beads.

2. The apparatus of claim 1 wherein the radial distance between the axis of rotation of the crank arm and the lubricating member is at least as great as a radius of the opening of the tire to be lubricated.

3. The apparatus of claim 1 wherein the radial distance between the axis of rotation of the crank arm and the lubricating member is greater than a radius of the opening of the tire to be lubricated.

4. The apparatus of claim 1 wherein the at least one lubricating member further comprising:
   a first lubricating roller and a second lubricating roller spaced longitudinally from one another along a common axis.

5. The apparatus of claim 4 further comprising:
   the first and second rollers adjustably spaced longitudinally from one another to accommodate tires of varying axial width.

6. The apparatus of claim 1 wherein the moving means further comprises:
   a fluid operated actuator reciprocal between an extended position and a retracted position;
   a movable frame supporting the lubricating head for movement between the first and second positions; and
   a stationary guide member for guiding the movable frame along a fixed path of travel between the first and second positions as the actuator reciprocates between the extended and retracted positions.

7. The apparatus of claim 1 wherein the rotating means further comprises:
   a drive shaft supporting the crank arm for rotation about the axis of rotation; and
   a motor for rotating the shaft through at least 360°.

8. An apparatus for lubricating beads of pneumatic tires prior to mounting the tires on wheels comprising:
   tire supporting means for supporting an unmounted tire in a substantially horizontal manner;
   at least one lubricating, liquid-applying, member mounted adjacent the tire supporting means;
   drive means connected to the member for revolving the member about a substantially vertical axis;
   support means for supporting the member for movement in the vertical direction;
   lubricating liquid supply means for supplying lubricating liquid to the member; and
   control means for controlling operation of the support means for inserting the member within the central opening of the tire supported on the tire supporting means and revolving the member about the substantially vertical axis whereby lubricating liquid is applied to the beads by the member as the member moves with respect to the tire.

9. The apparatus of claim 8 wherein the drive means further comprises:
   a crank arm rotatable about said substantially vertical axis, wherein a radial distance between said substantially vertical axis of the crank arm and the lubricating member is at least as great as a radius of the opening of the tire to be lubricated.

10. The apparatus of claim 8 wherein the drive means further comprises:
    a crank arm rotatable about said substantially vertical axis, wherein a radial distance between said substantially vertical axis of the crank arm and the lubricating member is greater than a radius of the opening of the tire to be lubricated.

11. The apparatus of claim 8 wherein the at least one lubricating member further comprising:
    a first lubricating roller and a second lubricating roller spaced longitudinally from one another along a common axis.

12. The apparatus of claim 11 further comprising:
    the first and second rollers adjustably spaced longitudinally from one another to accommodate tires of varying axial width.

13. The apparatus of claim 8 wherein the support means further comprises:
    an actuator movable between a raised position and a lowered position;
    a movable frame supporting the lubricating member for movement between the raised position and the lowered position; and
    a stationary guide member for guiding the movable frame along a fixed path of travel between the raised position and the lowered position as the actuator moves between the raised and lowered positions.

14. The apparatus of claim 8 wherein the drive means further comprises:

a drive shaft supporting the lubricating member for rotation about an axis of rotation; and a motor for rotating the shaft through at least 360°.

15. An apparatus for lubricating beads of pneumatic tires prior to mounting the tires on wheels comprising:

conveyor means for moving tires having different outside diameters, axial widths, and central opening diameters fed in random success ion along a fixed path through a lubrication station;

intercept means positioned in proximity to the station and movable between a first position where tires delivered to the station by the conveyor means move freely through the station and a second position where tires delivered to the station by the conveyor means engage the intercept means to stop the tires on the conveyor means at the station, the intercept means for stopping successive tires of varying sizes to perform a lubrication operation on the tires of varying sizes when intermixed on the conveyor means in random order;

means for moving the intercept means selectively between the first and second positions; and at least one longitudinally extending, lubricating member having a first axis, the lubricating member having an axis of revolution offset from the first axis, such that two times a distance between the axis of revolution and the first axis is at least as great as a central opening diameter of tires to be lubricated.

16. The apparatus of claim 15 wherein the distance between the axis of revolution and the first axis is greater than a radius of the central opening diameter of tires to be lubricated.

17. The apparatus of claim 15 wherein the at least one lubricating member further comprising:

a first lubricating roller and a second lubricating roller spaced longitudinally from one another along the first axis.

18. The apparatus of claim 17 further comprising:

the first and second rollers adjustably spaced longitudinally from one another to accommodate tires of varying axial width.

19. The apparatus of claim 15 further comprising:

an actuator movable between a first position and a second position;

a movable frame supporting the lubricating member for movement between the first and second positions; and a stationary guide member for guiding the movable frame along a fixed path of travel as the actuator moves between the first and second positions.

20. The apparatus of claim 15 further comprising:

a drive shaft supporting the lubricating member for rotation about the axis of rotation; and a motor for rotating the shaft through at least 360°.

* * * * *